US009111097B2

United States Patent
Kiiveri et al.

(10) Patent No.: US 9,111,097 B2
(45) Date of Patent: Aug. 18, 2015

(54) SECURE EXECUTION ARCHITECTURE

(75) Inventors: Antti Kiiveri, Oulu (FI); Lauri Paatero, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1457 days.

(21) Appl. No.: 10/634,734

(22) Filed: Aug. 4, 2003

(65) Prior Publication Data

US 2005/0033969 A1 Feb. 10, 2005

(51) Int. Cl.
*G06F 21/76* (2013.01)
*G06F 21/57* (2013.01)
*G06F 21/78* (2013.01)

(52) U.S. Cl.
CPC ..................................... *G06F 21/57* (2013.01)

(58) Field of Classification Search
CPC ............ G06F 21/74; G06F 2221/2105; G06F 21/572; G06F 21/575; H04L 12/22; H04L 12/2461; H04L 41/28
USPC ................. 713/164, 167, 161, 189, 192, 323; 726/27, 30, 34–35
See application file for complete search history.

(56) References Cited

U.S. PATENT DOCUMENTS

| 5,305,460 | A | | 4/1994 | Kaneko et al. | |
|---|---|---|---|---|---|
| 5,737,760 | A | | 4/1998 | Grimmer, Jr. et al. | 711/163 |
| 5,844,497 | A | * | 12/1998 | Gray | 340/5.54 |
| 5,892,900 | A | | 4/1999 | Ginter et al. | 395/186 |
| 5,974,549 | A | | 10/1999 | Golan | |
| 6,009,524 | A | * | 12/1999 | Olarig et al. | 726/10 |
| 6,219,787 | B1 | | 4/2001 | Brewer | 713/167 |
| 6,266,754 | B1 | * | 7/2001 | Laczko et al. | 711/203 |
| 6,304,970 | B1 | * | 10/2001 | Bizzaro et al. | 726/2 |
| 6,378,072 | B1 | * | 4/2002 | Collins et al. | 713/187 |
| 6,449,281 | B1 | * | 9/2002 | Smith | 370/419 |
| 6,678,765 | B1 | * | 1/2004 | Moscovici et al. | 710/72 |
| 6,724,554 | B1 | * | 4/2004 | Braithwaite et al. | 360/60 |
| 6,968,459 | B1 | * | 11/2005 | Morgan et al. | 713/189 |
| 2001/0055980 | A1 | * | 12/2001 | Sato | 455/552 |
| 2002/0026567 | A1 | | 2/2002 | Naito et al. | |
| 2002/0040442 | A1 | * | 4/2002 | Ishidera | 713/300 |
| 2002/0099805 | A1 | | 7/2002 | Inami et al. | 709/221 |
| 2002/0099950 | A1 | * | 7/2002 | Smith | 713/200 |
| 2002/0166062 | A1 | * | 11/2002 | Helbig, Sr. | 713/200 |
| 2002/0184523 | A1 | * | 12/2002 | Barrenscheen | 713/200 |
| 2003/0196100 | A1 | * | 10/2003 | Grawrock et al. | 713/193 |

FOREIGN PATENT DOCUMENTS

| EP | 0930567 | 7/1999 |
|---|---|---|
| EP | 1225498 | 7/2002 |
| EP | 1262856 A2 | 12/2002 |

(Continued)

*Primary Examiner* — Venkat Perungavoor

(74) *Attorney, Agent, or Firm* — Harrington & Smith

(57) ABSTRACT

The present invention relates to circuitry and a method for providing data security, which circuitry contains at least one processor and at least one storage circuit. The invention is based on the idea that circuitry is provided in which a processor is operable in at least two different modes, one first secure operating mode and one second unsecure operating mode. In the secure mode, the processor has access to security related data located in various memories located within the circuitry. The access to these security data and the processing of them need to be restricted, since an intruder with access to security data could manipulate the circuitry. When testing and/or debugging the circuitry, access to security information is not allowed. For this reason, the processor is placed in the unsecure operating mode, in which mode it is no longer given access to the protected data.

18 Claims, 2 Drawing Sheets

(56) References Cited

FOREIGN PATENT DOCUMENTS

| JP | 60011934 | 1/1985 |
|----|----------|--------|
| JP | 1096747  | 4/1989 |
| JP | 5053790  | 3/1993 |
| JP | 5334195  | 12/1993 |
| JP | 6011935  | 1/1994 |
| JP | 2000076135 | 3/2000 |
| JP | 2002073418 | 3/2002 |
| JP | 2002215460 | 8/2002 |

* cited by examiner

SECURE EXECUTION ARCHITECTURE

CROSS-REFERENCE TO RELATED APPLICATION

Priority is claimed under 35 U.S.C. 119 from International Application PCT/IB02/03216 filed Aug. 13, 2002.

TECHNICAL FIELD OF THE INVENTION

The present invention relates to circuitry for providing data security, which circuitry contains at least one processor and at least one storage circuit. The present invention also relates to a method for providing data security in circuitry containing at least one processor and at least one storage circuit.

BACKGROUND ART

Various electronic devices, such as mobile telecommunication terminals, portable computers and PDAs require access to security related components such as application programs, cryptographical keys, cryptographical key data material, intermediate cryptographical calculation results, passwords, authentication of externally downloaded data etc. It is often necessary that these components, and the processing of them, is kept secret within the electronic device. Ideally, they shall be known by as few people as possible. This is due to the fact that a device, for example a mobile terminal, could possibly be tampered with if these components are known. Access to these types of components might aid an attacker with the malicious intent to manipulate a terminal.

Further, in the devices, these above mentioned security related components will be handled, processed and managed alongside more general components which do not require any secure processing. Therefore, a secure execution environment is introduced in which environment a processor within the electronic device is able to access the security related components. Access to the secure execution environment, processing in it and exit from it should be carefully controlled. Prior art hardware comprising this secure environment is often enclosed within a tamper resistant packaging. It should not be possible to probe or perform measurements and tests on this type of hardware which could result in the revealing of security related components and the processing of them.

An electronic device processing information in a secure environment and storing security related information in a secure manner is shown in U.S. Pat. No. 5,892,900. The patent discloses a virtual distribution environment securing, administering and controlling electronic information use. It comprises a rights protection solution for distributors, financial service providers, end-users and others. The invention uses electronic devices called Secure Processing Units to provide security and secure information storage and communication. Such a device, including a processor, is enclosed within a "tamper resistant security barrier", separating the secure environment from the outer world. The electronic device provides both the secure environment and an unsecure environment, in which latter case the processor of the device has no access to the security related information.

A problem that has to be solved is to enable for a third party to perform testing, debugging and servicing of the electronic device and its software without risking that the third party is given access to information which makes it possible to manipulate the security related components of the device so as to affect the security functions when in the secure environment. It should be possible to move between the two environments smoothly, without having to initialize one or the other every time a movement is effected.

SUMMARY OF THE INVENTION

It is an object of the present invention to provide a solution to the above given problem by proposing an architecture comprising a secure environment in which it is possible to store and process information such as cryptographical keys and other security related data in a secure way and still making it possible to test and debug the architecture and its accompanying software in an unsecure environment without giving access to the security data.

According to the first aspect of the invention, circuitry is provided comprising at least one storage area in a storage circuit, in which storage area protected data relating to circuitry security are located. The circuitry is arranged with mode setting means arranged to place a processor comprised in the circuitry in one of at least two different operating modes, the mode setting means being capable of altering the processor operating modes. Further, it comprises storage circuit access control means arranged to control the processor to gain access to the storage area in which protected data are located based on a first processor operating mode, and arranged to prevent the processor from accessing the storage area in which protected data are located, based on a second processor operating mode, thereby enabling the processor to execute non-verified software downloaded into the circuitry.

According to the second aspect of the invention, a method is provided wherein protected data relating to circuitry security is stored in a storage circuit. A processor is set in one of at least two different alterable operating modes. The method further comprises the step of enabling the processor to access a storage area in which the protected data are located by setting the processor in a first operating mode and preventing the processor from accessing the storage area in which protected data are located by setting the processor in a second operating mode, thereby enabling the processor to execute non-verified software downloaded into the circuitry.

The invention is based on the idea that circuitry is provided in which a processor is operable in at least two different modes, one first secure operating mode and one second unsecure operating mode. In the secure mode, the processor has access to security related data located in various memories located within the circuitry. The security data include cryptographical keys and algorithms, software for booting the circuitry, secret data such as random numbers used as cryptographical key material, application programs etc. The circuitry can advantageously be used in mobile telecommunication terminals, but also in other electronic devices such as computers, PDAs or other devices with need for data protection. In the case where the circuitry is placed within a mobile telecommunication terminal, it might be desirable that the circuitry provides the terminal with a unique identification number and accompanying keys for cryptographic operations on the identification number. The access to these security data and the processing of them need to be restricted, since an intruder with access to security data could manipulate the terminal. When testing and/or debugging the terminal, access to security information is not allowed. For this reason, the processor is placed in the unsecure operating mode, in which mode it is no longer given access to the protected data.

The invention advantageously enables the processor of the circuitry to execute non-verified software downloaded into the circuitry. This allows testing, debugging and servicing of the electronic device and its software without risking that a third party is given access to information which makes it possible to manipulate the security related components of the device so as to affect the security functions when in the secure environment.

It should be noted that in U.S. Pat. No. 5,892,900, the unsecure mode is the "normal" mode, used when transactions and communications must be secure, whereas in the present invention, the secure mode is the normal mode. In the present invention, unsecure mode is only entered during testing and/or debugging or other types of special cases when security data must be protected, i.e. when secure mode can not be practically maintained.

The present invention eliminates the use for special purpose terminals adapted for use in research and development. During a development stage, it is sometimes a requirement to be able to download untrusted and/or unchecked code into terminals. By enabling the unsecure mode, a channel is provided into the terminal without giving access to security related components. Consequently, the same terminal can be utilized for normal operation as well as in the development stage. It should be understood that it is rather expensive to manufacture special purpose terminals.

According to an embodiment of the invention, the circuitry of the invention is arranged with a timer controlling the time period during which the processor is in the unsecure mode. If other security controlling actions should fail, a maximum given time period is set during which access is given to unsecure processor mode. This restrains the possibility for an intruder to perform debugging and testing of the device.

According to another embodiment of the invention, authentication means are provided, which means being arranged to authenticate data externally provided to the terminal. An advantage with this feature is that during the manufacturing stage, and other stages where normal, secure operating mode is not yet activated, the terminal can be used for a limited time period, sufficient to load accepted, signed code into the terminal. It is also possible to download signed code packages into the terminal during secure mode operation. This facilitates the possibility to add new security features to the terminal, bringing flexibility to the architecture. The architecture enables the applications to be divided into secure and unsecure parts. The circuit checks the code packages which are signed appropriately. Secure applications are downloaded to, and executed from, the storage area holding the protected data. This makes downloading of data smoother. If this feature was not present, it would be necessary to download secure applications and unsecure applications separately.

According to yet another embodiment of the invention, the circuitry is arranged with means for indication of the mode in which the processor is operating. It is appropriate that a mode register is set within the circuitry, keeping track of the current mode. In case the circuitry is arranged within a mobile telecommunication terminal, it should be possible to indicate on the terminal display, via the terminal loudspeaker or in any other visual way, to a terminal user the fact that the terminal is operating in unsecure mode. This will draw the user's attention to the fact that unsecure mode has been entered.

In accordance to further embodiments of the present invention, the mode setting means arranged to control the modes of the processor comprise an application program. This has the advantage that the mode could be set by the device itself, not having to rely on external signals. From a security viewpoint, this is preferable since by controlling the application software, the setting of processor modes can also be controlled. It is also possible to have an external signal connected to the circuitry, by which signal it is possible to control the processor mode. By using an external signal, a mode change can be executed easy and fast, which can be advantageous in test environments. A combination of these two mode setting means is feasible.

BRIEF DESCRIPTION OF THE DRAWINGS

The present invention will be described in greater detail with reference to the following drawings, wherein.

DESCRIPTION OF PREFERRED EMBODIMENTS OF THE INVENTION

Figure 1:
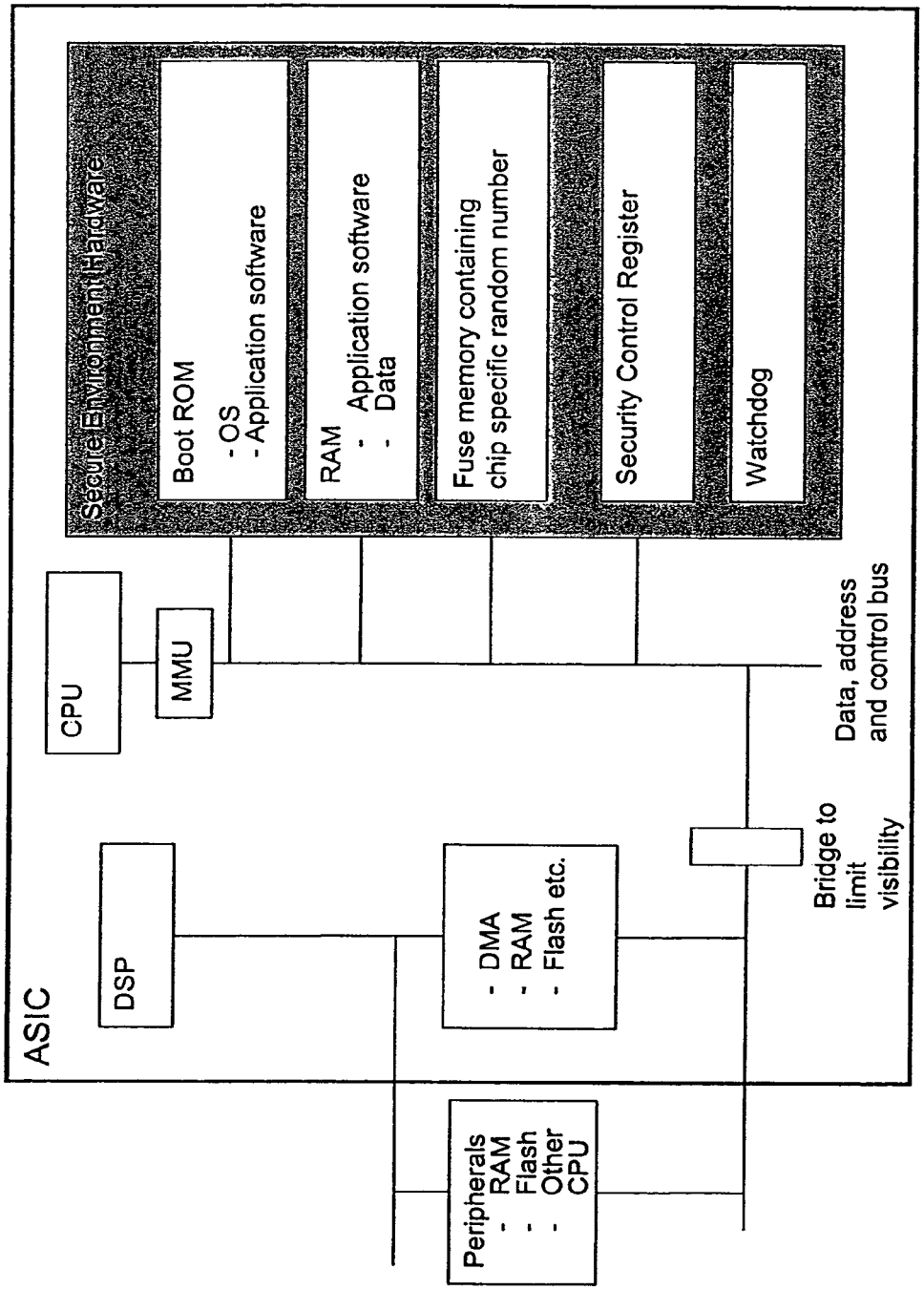
FIG. 1 shows a block diagram of a preferred embodiment of circuitry for providing data security according to the present invention.

FIG. 1 shows a block diagram of a preferred embodiment of the present invention. As can be seen, the architecture in FIG. 1 contains both software and hardware. The architecture is implemented in the form of an ASIC (Application Specific Integrated Circuit). The processing part of the architecture contains a CPU and a digital signal processor DSP. These two processor can be merged into one single processor. Normally the CPU handles communication operations and the DSP handles the computation of data.

The secure environment comprises a ROM from which the ASIC is booted. This ROM contains boot application software and an operating system OS. The operating system controls and executes applications and offers various security services to the applications such as control of application software integrity and access control. The operating system has access to the ASIC hardware and it cannot itself provide rigorous hardware security, but it must rely on the security architecture.

Certain application programs residing in the secure environment, i.e. the protected data storage area, has precedence over other application programs. In a mobile telecommunication terminal, in which the ASIC can be arranged, a boot software should exist, which software includes the main functionality of the terminal. It is not possible to boot the terminal to normal operating mode without this software. This has the advantage that by controlling this boot software, it is also possible to control the initial activation of every terminal.

The secure environment also comprises RAM for storage of data and applications. The RAM preferably stores so called protected applications, which are smaller size applications for performing security critical operations inside the secure environment. Normally, the way to employ protected applications is to let "normal" applications request services from a certain protected application. New protected applications can be downloaded into the secure environment at any time, which would not be the case if they would reside in ROM. Secure environment software controls the download and execution of protected applications. Only signed protected applications are allowed to run. The protected applications can access any resources in the secure environment and they can also communicate with normal applications for the provision of security services.

In the secure environment, a fuse memory is comprised containing a unique random number that is generated and programmed into the ASIC during manufacturing. This random number is used as the identity of a specific ASIC and is further employed to derive keys for cryptographic operations. Further, storage circuit access control means in the form of a security control register is arranged. The purpose of the security control register is to give the CPU access to the secure environment, or preventing the CPU from accessing the secure environment, depending on the mode set in the register. The processor operating modes can be set in the register by application software, resulting in the fact that the architecture does not have to rely on external signals. From a security viewpoint, this is preferable since by controlling the application software, the setting of processor modes can also be controlled. It is also possible to have an external signal (not shown) connected to the ASIC, by which signal it is possible to set the security control register. By using an external signal, a mode change can be executed easily and quickly, which can be advantageous in test environments. A combination of these two mode setting means is feasible.

Preferably, the mobile telecommunication terminal should indicate on the terminal display, via the terminal loudspeaker or in any other visual way, to a terminal user the fact that the terminal is operating in unsecure mode. This will make the user aware of the fact that unsecure mode has been entered.

A watchdog is arranged for various timer purposes. In case signature verification of downloaded software fails, checksums does not match or some other error is detected, the operation of the ASIC, or the mobile telecommunication terminal it is arranged in, should stop. This should preferably not be done immediately when the error occurs. A random timeout, e.g. different time spans up to 30 seconds, is desired. This makes it more difficult for an attacker to detect the instant at which the terminal has detected the error. The disabling of watchdog updating is set in the security control register. The result of this operation is that the terminal will reset itself. The watchdog can also control the time period during which the processor is in the unsecure mode. If other security controlling actions should fail, a maximum given time period is set during which access is given to unsecure processor mode. This restrains the possibility for an intruder to perform debugging and testing of the device.

The CPU is connected to the secure environment hardware via a memory management unit MMU that handles memory operations. It also maps virtual addresses to physical addresses in memory for processes executed in the CPU. The MMU is located on a bus containing data, address and control signals. It is also possible to have a second MMU arranged to handle the memory operations for the ASIC RAM located outside the secure environment. A standard bridge circuit for limitation of data visibility on the bus is arranged within the ASIC. The architecture should be enclosed within a tamper resistant packaging. It should not be possible to probe or perform measurements and tests on this type of hardware which could result in the revealing of security related components and the processing of them. The DSP has access to other peripherals such as a direct memory access (DMA) unit. DMA is provided by the architecture to allow data to be sent directly from the DSP to a memory. The DSP is freed from involvement with the data transfer, thus speeding up overall operation. Other peripherals such as RAMs, flash memories and additional processors can be provided outside the ASIC. A RAM is also arranged outside the secure environment in the ASIC, which RAM holds the non-verified software executed by the CPU.

By providing the above described architecture in which the CPU is operable in two different modes, one secure operating mode and one unsecure operating mode, the CPU of the architecture can be enabled to execute non-verified software downloaded into the ASIC. This is due to the fact that only verified software has access to the secure environment. This allows testing, debugging and servicing of the mobile telecommunication terminal and its software without risking that a third party is given access to information which makes it possible to manipulate the security related components of the device so as to affect the security functions when in the secure environment.

In the secure mode, the processor has access to security related data located within the secure environment. The security data include cryptographical keys and algorithms, software for booting the circuitry, secret data such as random numbers used as cryptographical key material, application programs etc. The circuitry can advantageously be used in mobile telecommunication terminals, but also in other electronic devices such as computers, PDAs or other devices with need for data protection. The access to these security data and the processing of them need to be restricted, since an intruder with access to security data could manipulate the terminal. When testing and/or debugging the terminal, access to security information is not allowed. For this reason, the processor is placed in the unsecure operating mode, in which mode it is no longer given access to the protected data within the secure environment.

Figure 2:
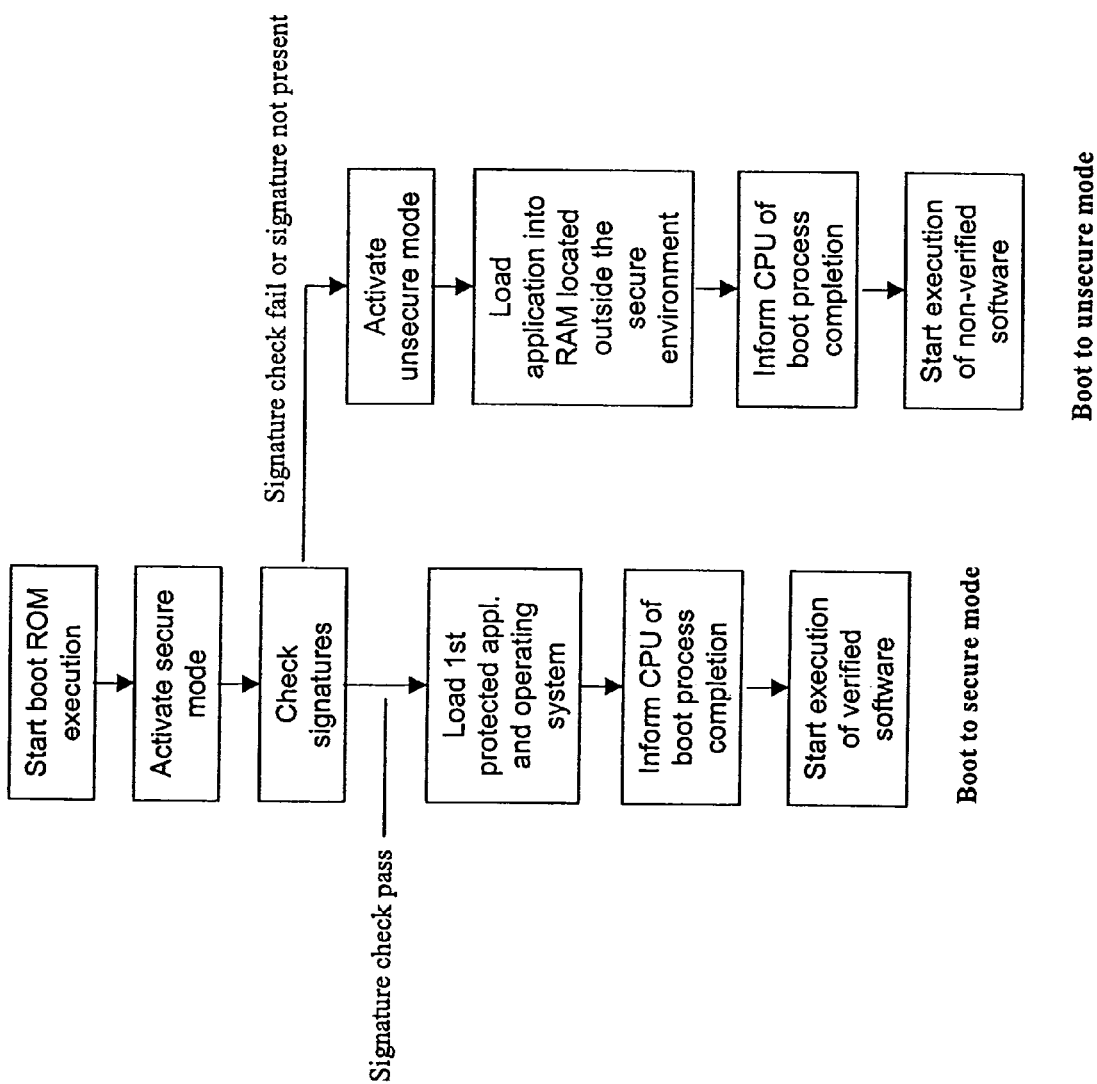
FIG. 2 shows a flow chart of a boot process for the circuitry according to the present invention.

FIG. 2 illustrates a flow chart of the power up boot process for the architecture. At power up, ROM boot software activates secure mode for initial configuration. Then, signatures for the first protected application and operating system to be downloaded are checked. If the signatures are correct, the application and the operating system is downloaded into the secure environment RAM. When the desired software has been downloaded, the CPU is informed that the download is completed and the CPU starts executing the verified software. The operating system and protected application have thus been downloaded into the secure environment in a secure and trusted manner.

However, if the signature check fails or if no signature is present, unsecure mode is activated and the non-verified application is loaded into the ASIC RAM located outside the secure environment. Possibly, the watchdog is set to limit the time period during which the unsecure mode is activate. A maximum time period is set during which the unsecure mode is active. When boot is completed, this non-verified application is executed by the CPU. The secure environment is now inaccessible.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:
1. An apparatus comprising
at least one processor; and
at least one non-transitory memory including computer program code, the at least one memory and the computer program code configured to, with the at least one processor, cause the apparatus at least to:
   store protected data relating to security functions of circuitry and protected applications in a storage area in the at least one memory;
   authenticate software provided to the apparatus;
   based upon a signature check of an application to be downloaded, set the at least one processor in one of at least two different processor operating modes comprising:
      a first processor operating mode which, while the at least one processor is operating in the first processor operation mode,
      enables the at least one processor to access the protected data in the storage area, and allows the software which has been authenticated and the protected applications to have access to the protected data in the storage area; and a second processor operating mode which, while the at least one processor is operating in the second processor operation mode, prevents the at least one processor from accessing the protected data in the storage area, allows the at least one processor to execute non-verified software downloaded into the apparatus, and prevents access to the protected data relating to the security functions of circuitry and the protected applications in the storage area.

2. An apparatus as in claim 1 further comprising a timer arranged to control a time period during which the at least one processor is in the second processor operating mode.

3. An apparatus as in claim 1 further comprising means arranged to indicate in which mode the at least one processor is operating.

4. An apparatus as in claim 1 wherein the computer program code is at least part of an application program.

5. An apparatus as in claim 1 wherein the apparatus is in a mobile telecommunication terminal.

6. An apparatus as in claim 1 wherein the at least one processor comprises a Central Processor Unit (CPU).

7. A machine-implemented method comprising:

storing protected data relating to security functions of circuitry and protected applications in a storage area in at least one memory of an apparatus;

authenticating software provided to the apparatus;

based upon a signature check of an application to be downloaded, setting at least one processor in one of at least two different processor operating modes comprising:

a first processor operating mode which, while the at least one processor is operating in the first processor operation mode, enables the at least one processor to access the protected data in the storage area, and allows the software which has been authenticated and the protected applications to have access to the protected data in the storage area; and a second processor operating mode which, while the at least one processor is operating in the second processor operation mode, prevents the at least one processor from accessing the protected data in the storage area, allows the at least one processor to execute software, downloaded into the apparatus, which has not be authenticated, and prevents access to the protected data relating to the security functions of circuitry and the protected applications in the storage area.

8. A machine-implemented method as in claim 7 further comprising controlling a time period during which the at least one processor is in the second processor operating mode by means of a timer.

9. A machine-implemented method as in claim 6 further comprising indicating in which mode the at least one processor is operating.

10. A machine-implemented method as in claim 7, wherein the setting of the at least one processor is performed by means of an application program.

11. A machine-implemented method as in claim 7, wherein the at least one processor and the at least one memory are in a mobile telecommunication terminal.

12. A machine-implemented method as in claim 7, wherein the at least one processor comprises a Central Processor Unit (CPU).

13. A non-transitory program storage device readable by an apparatus, tangibly embodying a program of instructions executable by the apparatus for performing operations, the operations comprising:

based upon a signature check of an application to be downloaded, setting a processor to a first processor operating mode which, while the at least one processor is operating in the first processor operation mode, enables the processor to access a storage area in a memory of an apparatus, where the storage area comprises protected data relating to security functions of circuitry and protected applications and, allows software which has been authenticated and protected applications to have access to the protected data in the storage area of the memory; and alternatively setting the processor to a second different processor operating mode which, while the at least one processor is operating in the second processor operation mode, prevents the processor from accessing the protected data in the storage area of the memory, allows the processor to execute software downloaded into the apparatus which has not been authenticated, and prevents access to the protected data relating to the security functions of circuitry and the protected applications in the storage area in the memory.

14. A non-transitory program storage device as in claim 13 the operations further comprise controlling a time period during which the at least one processor is in the second processor operating mode by means of a timer.

15. A non-transitory program storage device as in claim 13 the operations further comprise indicating in which mode the at least one processor is operating.

16. A non-transitory program storage device as in claim 13 the operations further comprise setting of the at least one processor being performed by means of an application program.

17. A non-transitory program storage device as in claim 13 the operations further comprise wherein the processor and the memory being in a mobile telecommunication terminal.

18. A non-transitory program storage device as in claim 13 where the processor is a Central Processor Unit (CPU).

* * * * *